(No Model.)

H. A. SCHERMERHORN.
NECK YOKE.

No. 275,714. Patented Apr. 10, 1883.

Witnesses:
Frank S. Blanchard
Will R. Omohundro

Inventor:
Huschel A. Schermerhorn
By Price Fisher
His Attorneys.

UNITED STATES PATENT OFFICE.

HERSCHEL A. SCHERMERHORN, OF WATERMAN, ILLINOIS, ASSIGNOR TO WILLIAM L. COLTON, OF SAME PLACE, AND A. L. BAKER AND WILLIAM EGERMANN, OF AURORA, ILLINOIS.

NECK-YOKE.

SPECIFICATION forming part of Letters Patent No. 275,714 dated April 10, 1883.

Application filed November 24, 1882. (No model.)

*To all whom it may concern:*

Be it known that I, HERSCHEL A. SCHERMERHORN, of Waterman, Dekalb county, in the State of Illinois, have invented certain new and useful Improvements in Neck-Yokes; and I hereby declare the following to be a full, clear, and exact description of the same, such as will enable others skilled in the art to which it pertains to make and use it, reference being had to the accompanying drawings, forming part of this specification.

My present invention relates particularly to the construction of metallic neck-yoke centers, and has for its object to provide a yoke-center of improved form, the parts of which shall be simple, strong, and durable, and can be cheaply manufactured and readily put together, and which, when uniting the yoke-bar and the pole, will yield in the desired directions to the movements of the latter. This object of my invention I have accomplished by the mechanism hereinafter described, illustrated by the accompanying drawings, and particularly defined in the claims at the end of the specification.

Figure 1:
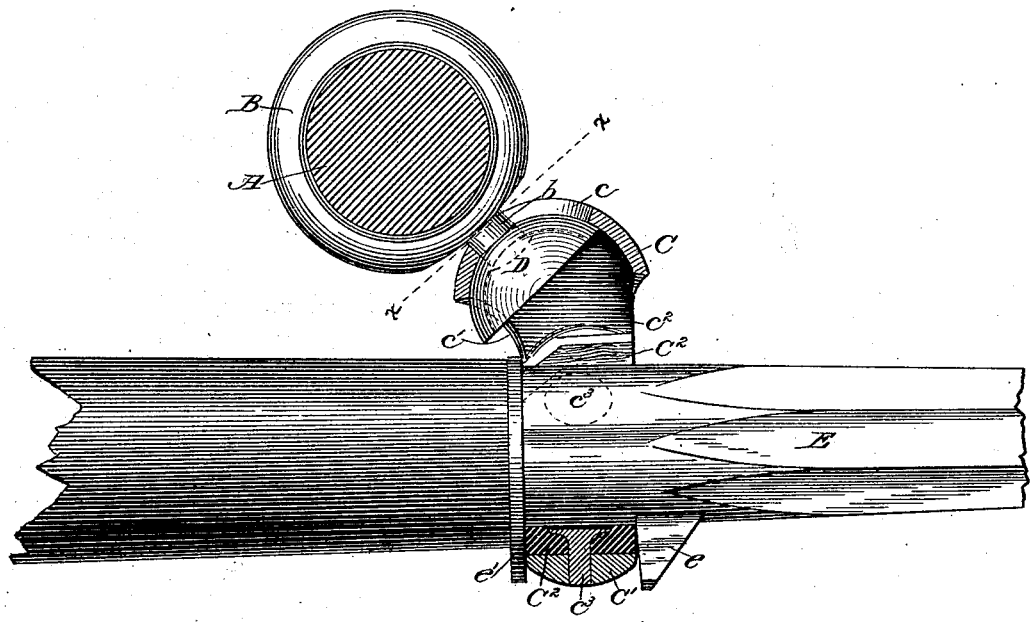
Figure 2:
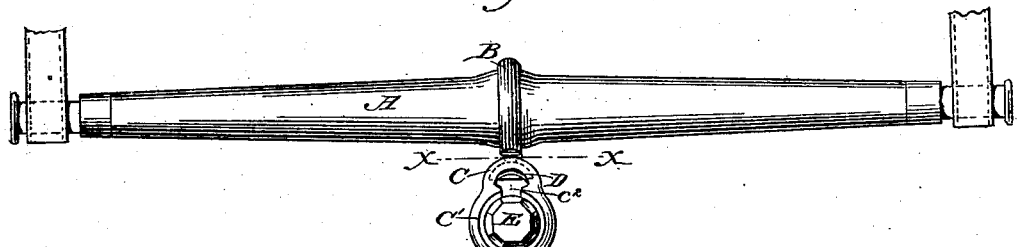
Figure 3:
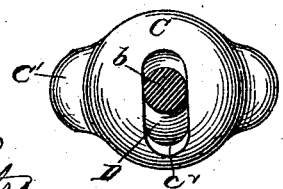

Figure 1 is a view showing partly in side elevation and partly in section the yoke and pole connected together. Fig. 2 is a front view of the connected yoke and pole, and Fig. 3 is a view partly in plan and partly in section through line $x$ $x$ of Figs. 1 and 2.

Like parts are indicated by similar letters of reference in the several figures of the drawings.

A designates the yoke-bar, around which fits the yoke-ring B, having formed integral therewith, or otherwise suitably connected thereto, the stud or bolt $b$, which enters the oblong slot $c$ of the enlarged concave-convex top C of the pole-ring C'. A portion of this stud or bolt V, which is preferably screw-threaded, is passed through the hemispherical shell D, and is securely connected thereto by upsetting or riveting its end upon the under side of the shell, as shown in dotted lines in Fig. 1. The back of the top C is cut away at $c'$ to permit the insertion of the shell D, and in its front is formed the space or slot $c^2$, through which and the space $c'$ passes the lug $e$, formed upon the under side of the cap E of the pole when the yoke is placed upon the pole. To the inner face of the pole-ring C' is attached in any suitable manner, but preferably by the rivet $c^3$, the washer $C^2$, of rubber or like material, which serves to decrease the wear of the cap and ring; and in order to place the yoke in position upon the pole it is necessary to reverse the position of the yoke-bar holding it beneath the pole while slipping the yoke-ring C' over the cap E, thus permitting the lug $e$ to pass through the space $c'$ and $c^2$, and when the yoke-ring bears against the annular flange $e'$ of the cap it is turned to the position shown in the drawings, and in such position is guarded by the lug $e$ and flange $e'$ against any accidental displacement.

From the above-described construction it will be seen that the parts of my improved yoke-center are few and simple, are of such form that they can be easily manufactured and readily put together, and the joint between the yoke-ring and the pole-ring is a most durable one, as the wear is borne by the broad curved surfaces of the ball-and-socket connection. The yoke, when in position upon the tongue, yields to the movements of the latter, and is protected against displacement, which is the cause of frequent accidents when neck-yokes having the usual leather centers are employed.

Having thus described my invention, what I claim as new, and desire to secure by Letters Patent, is—

1. The combination, with the yoke-ring having a hemispherical shell secured to a projecting bolt thereof, of a pole-ring enlarged and rounded at its top to seat said shell, substantially as described.

2. The combination, with the yoke-ring having a hemispherical shell secured to a projecting bolt thereof, of a pole-ring enlarged and slotted at its top to seat said shell and to allow for play of the projecting-bolt, substantially as described.

3. The combination, with the yoke-ring, its stud, and convex shell, of the pole-ring, having an enlarged slotted top suitably cut away to admit passage of a lug on the pole-cap, substantially as set forth.

HERSCHEL A. SCHERMERHORN.

Witnesses:
HARRY BRADBURY,
W. L. COLTON.